(No Model.)

3 Sheets—Sheet 1.

J. B. BENTON.
FARE REGISTER.

No. 260,526.

Patented July 4, 1882.

Witnesses
Harry King.
Nellie Holmes.

Inventor
John B. Benton

By his Attorneys.
Baldwin, Hopkins & Peyton (No Model.)  3 Sheets—Sheet 2.

J. B. BENTON.
FARE REGISTER.

No. 260,526.  Patented July 4, 1882.

Witnesses  Inventor
Harry King  John B. Benton
Nellie Holmes.  By his Attorneys.
Baldwin, Hopkins & Peyton.

(No Model.) 3 Sheets—Sheet 3.

J. B. BENTON.
FARE REGISTER.

No. 260,526. Patented July 4, 1882.

Witnesses
Harry King
Nellie Holmes

Inventor
John B. Benton
By his Attorneys
Baldwin, Hopkins & Peyton

United States Patent Office.

JOHN B. BENTON, OF NEW YORK, ASSIGNOR TO THE RAILWAY REGISTER MANUFACTURING COMPANY, OF BUFFALO, N. Y.

FARE-REGISTER.

SPECIFICATION forming part of Letters Patent No. 260,526, dated July 4, 1882.

Application filed October 31, 1881. (No model.)

*To all whom it may concern:*

Be it known that I, JOHN B. BENTON, of the city, county, and State of New York, have invented certain new and useful Improvements in Fare-Registers, of which the following is a specification.

My invention relates to the class of machines commonly known as "fare-registers," and belongs more especially to the type of such machines which embody in their organization an index-hand or pointer to indicate upon a graduated dial in full view the number of fares collected by the conductor upon each trip or partial trip of the car or vehicle.

My object is provide registers having a trip index-hand or pointer, with a simple device which will expose, by the aid of the graduated dial of the machine, the conductor, should he fail to reset the trip-hand exactly to zero or the starting-point at the proper times—for example, at the end of each trip; and my said invention consists in a hand or pointer, which I call a "tell-tale" hand, applied to the machine in addition to the trip-hand, so as to show the division or point upon the dial from which the trip-hand is moved in the counting operation at the beginning of the trip or after being reset.

The subject-matter claimed is particularly pointed out at the close of the specification.

The accompanying drawings show my present improvements as embodied in the best way now known to me. My improvements may be embodied in other ways, however, some of which will readily suggest themselves to those skilled in the art.

Figure 2:
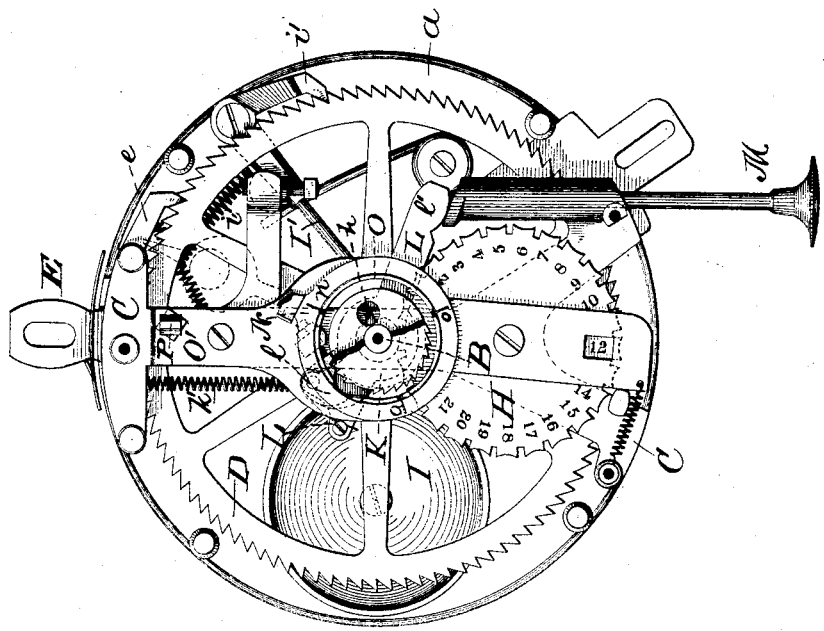
Figure 1:
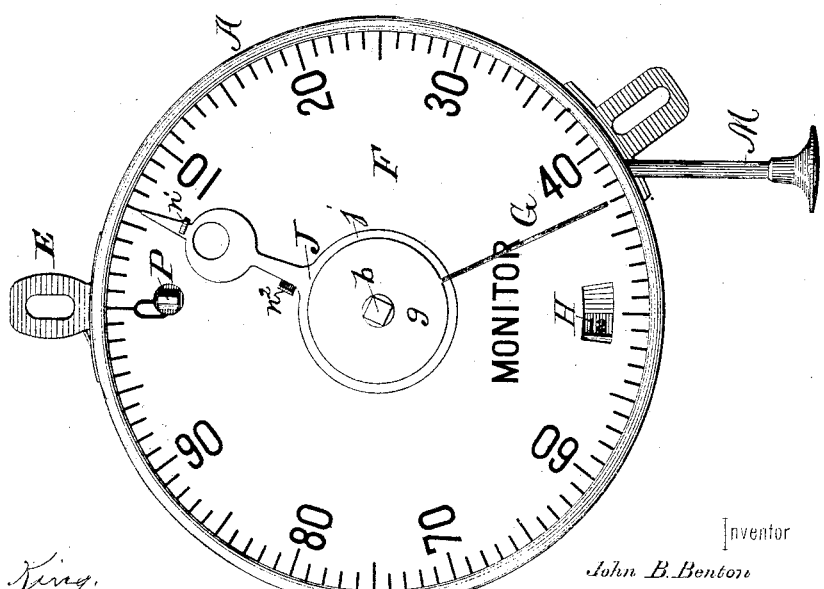
Figure 3:
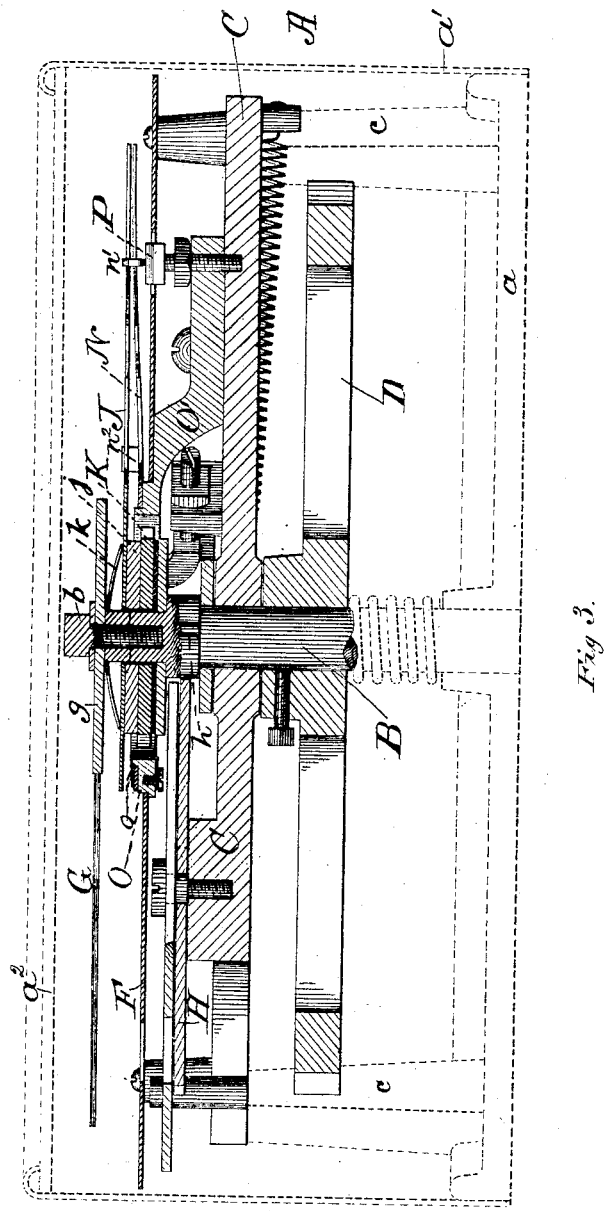
Figure 4:
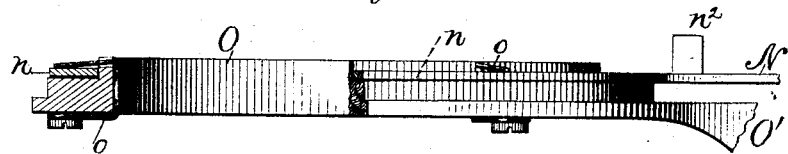
Figure 5:
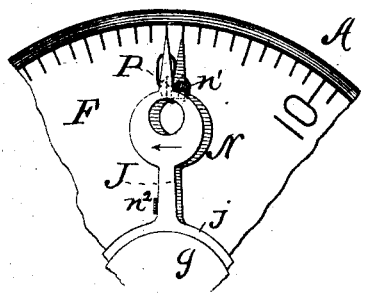
Figure 7:
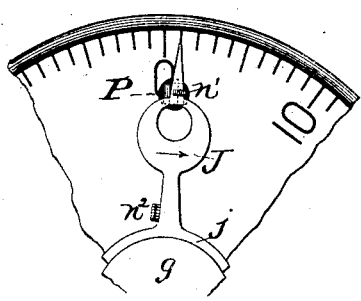
Figure 6:
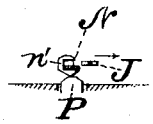
Figure 8:
Figure 9:
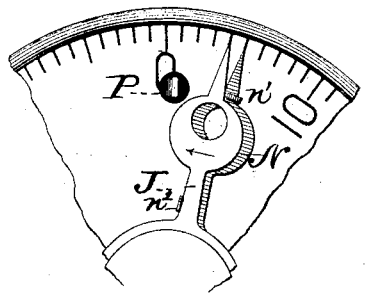
Figure 11:
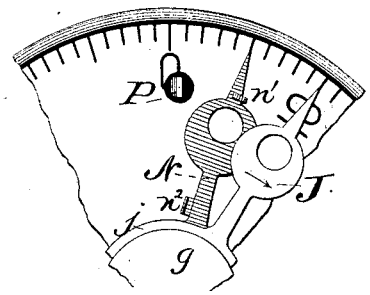
Figure 10:
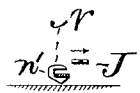
Figure 12:

In said drawings, Figure 1 is a face view of a trip hand-register having my improvements applied thereto. Fig. 2 is a front view thereof with the glass face-plate, the graduated dial, and other parts removed to show more clearly the parts behind them. Fig. 3 is a central section through the machine. Fig. 4 is an enlarged partially sectional view of the circular frame which supports the hub of the tell-tale hand; and Figs. 5 to 12, inclusive, are views in detail, showing different positions assumed by the trip and tell-tale hands of the machine in its operation.

The machine shown in the drawings resembles in its general features the duplex registers patented to H. E. Towle and myself, jointly, April 27, 1875, as No. 162,717, (subsequently reissued, September 5, 1876, as No. 7,290,) and to me August 24, 1875, as No. 167,057, (subsequently reissued, July 20, 1880, as No. 9,312,) and November 2, 1880, as No. 233,915. It will be unnecessary, therefore, to elaborately describe in detail the parts of the machine which are shown, described, and claimed in said patents, and I will therefore content myself with a description of the various parts so far only as is necessary to an understanding of my present invention.

The inclosing-casing A consists of a circular back plate, $a$, circular rim $a'$, and glass face-plate $a^2$. A central shaft, B, turns in bearings at rear in the back plate of the casing and in front in a supporting-plate, C, connected with the base-plate by suitable posts, $c$. A comparatively large ratchet-wheel, D, having preferably one hundred teeth in its periphery, is keyed firmly upon the shaft B, and said wheel is operated step by step, or a tooth at a time, to turn said shaft by means of a lever, E, carrying a driving-pawl, $e$, engaging the teeth of said wheel.

Upon the end of the turning-shaft B, in front of a graduated dial, F, having one hundred divisions corresponding to the teeth of the wheel $b$, is firmly fastened—by the screw $b$, for example—an index-hand, G. Said index-hand, in connection with its operating mechanism and the graduated dial, constitutes the permanent or general register of the machine, and is for the purpose of registering consecutively each fare as received on a large number of trips of the car or vehicle, there being beneath said graduated dial F a multiplying-wheel, H, which is moved one point for each complete rotation of the index-hand G around the dial. Said general register therefore is capable of showing the total number or aggregate of the fares registered on a large number of trips or for a long period of time. The movement is communicated to the hundreds-wheel H, which has a notched periphery, by means of the tooth $h$ on the shaft B. The conductor is required, as each fare is received, to operate the machine, and this operation advances the index-hand G one point on the dial, (which is graduated to correspond with the teeth in the large actuating or driving ratchet-wheel D, as aforesaid,) while at the same time an alarm is sounded. The alarm apparatus consists of a bell, I, and a pivoted hammer, I', acted upon by a spring, i, and having a pawl, i', engaging the teeth of the ratchet-wheel D. As said ratchet-wheel is rotated the hammer is tripped to sound the alarm.

An index-hand, J, is fitted by its hub j loosely upon the shaft B, so as to be in front of the graduated dial F and back of the permanent index-hand G. A spring-washer, k, is interposed between the back of the hub g of the index-hand G and front of the hub j of the hand J, and exerts sufficient force upon said hand J to cause it to turn forward with the hand G in the counting process, due to the rotation of the shaft B step by step as the wheel D is actuated by the lever or prime mover E. This washer or friction-connection between the index-hand J and shaft B permits said hand to be turned or adjusted independently of the shaft and permanent index-hand G, so that it may be set to the zero or the starting-point at will. Said adjustable index-hand J constitutes, in connection with its operating devices and the graduated dial F, the trip-register of the machine, and is for the purpose of registering consecutively and simultaneously with the general register the fares collected on each trip or partial trip of the car or vehicle, it being the duty of the conductor to reset the trip-hand to zero of the starting-point at the end of each trip or partial trip, as the case may be, so as to commence registering anew, while the permanent register hand or pointer is unadjustable, and registers, as before stated, in the aggregate the fares received on a large number of trips.

A ratchet-wheel, K, is firmly connected to the back of the hub j of the trip-hand J, and has its teeth running in a direction the reverse of those of the driving-wheel D. (See Fig. 2.) The teeth of said ratchet-wheel K are acted upon by a pawl, l, pivoted to a carrier or lever, L, fulcrumed upon the shaft B. Said lever is vibrated about the shaft B by means of a push-key, M, inserted through an opening in the rim of the casing and acting upon the end l' of said lever. An inward stroke of the push-key raises the end l' of the lever L and brings the resetting-pawl l into engagement with the teeth of the ratchet-wheel K, and thereby turns said wheel and the trip-hand connected with it backward—in this example to reset the said trip-hand to zero. In this intance the trip-hand cannot be reset or moved independently of the general register beyond the zero-point, owing to the fact that some of the teeth in the wheel K are omitted, whereby, when the trip-hand reaches zero the pawl l cannot engage the teeth of the wheel to move it farther. As soon as the pressure upon the push-key M is removed it is thrust outward for a new stroke, and the pawl l withdrawn from contact with the wheel K by means of a spring, k'. If one inward stroke of the push-key is not sufficient to reset the trip-hand or bring it to zero, the reciprocation of the key is repeated.

As thus far described, the machine is substantially identical in construction with the machine shown in my aforesaid Letters Patent No. 233,915, of November 2, 1880, and reference is made to said patent for an accurate and full description of the parts before described.

As has been described, there is a general register to register consecutively the total number or aggregate of the fares collected, a trip-hand to register consecutively the fares collected on each trip, and an alarm to be sounded for each simultaneous actuation of the general and trip registers.

In order to compel the conductor, when he resets the trip-hand to commence registering anew, to move the hand exactly to zero or the starting-point, so as to commence registering on each trip from the proper point on the dial, or to insure his detection if he fails to properly reset said hand, I provide the machine with a tell-tale hand or pointer, N, which will show upon the graduated dial of the machine whether the trip-hand in being reset was moved exactly to zero or the starting-point.

Before describing in detail the preferred manner of applying and operating the tell-tale hand, I will briefly indicate one way by which, without the said "tell-tale," frauds might be committed with, in some instances, diminished chances of detection. Suppose at the end of a trip and before the trip-hand is reset there should enter the car for the new trip, say, eight passengers. The conductor, before the car starts on the new trip, must reset his trip-hand; but instead of moving it exactly to zero he may move it to indicate, say, four fares on the machine, and he may then, as he collects the eight fares, operate the machine to indicate four more. The total register will then show only an increase of four over its former record, while the trip-hand will indicate that eight fares have been registered, thus deceiving those in the car. The amount of the four fares the conductor has fraudulently failed to register may then be appropriated, and at or near the end of the trip, after collecting and properly registering the fares of other passengers who may enter the car, the conductor may turn the trip-hand back four points to make it correspond with the indications of the general register. The total and trip registers of the machine, when inspected at the end of the trip by the proper official, will correspond and the conductor's fraud be undiscovered. Said tell-tale hand N is preferably connected to or formed with a ring or hub, n, fitted to turn freely around a circular frame or annulus, O, as an axis, said axis being concentric with the axis of the shaft B, about which the trip-hand is turned when being reset. Said annulus or frame O is firmly connected with or forms part of an arm, O', by which it is supported, and said arm is firmly fastened to the supporting-plate C of the register, as clearly shown in Figs. 2 and 3. The hub n, while free to turn around the frame or annulus O, is held in place thereon by means of suitable wire fastenings, o, for example, as shown in Figs. 2, 3, and 4.

The tell-tale hand or pointer is preferably the size and shape of the trip-hand of the register, and is located between said trip-hand and the graduated dial of the machine. Said tell-tale hand is preferably constructed of spring brass or steel, and its tendency is to lie close to the face of the graduated dial. Said tell-tale hand is also provided with two projecting parts, one being a hooked-shaped projection, $n'$, near the point of the hand and at one side thereof, and the other a bent-up projection, $n^2$, near the center of the hand, extending upward or outward from the side thereof opposite that from which the projection $n'$ extends, all of which is clearly shown in the drawings.

The present organization of the trip and tell-tale hands is such that the trip-hand near its point engages the hook $n'$ of the tell-tale hand and carries said tell-tale hand with it in the counting operation. (See Figs. 1, 3, 7, and 8.) When, however, at the end of the trip or other time, the trip-hand is being reset by its resetting mechanism independently of the general register, the trip-hand will move one point backward on the dial without moving the tell-tale hand. (See Figs. 5 and 9.) This movement of the trip-hand draws it from under the hooked projection $n'$ of the tell-tale hand, and permits said tell-tale hand to spring away from the trip-hand toward the dial. The two hands are not completely separated, however, as the movement which disengages the trip-hand from the hooked projection $n'$ carries said trip-hand against the bent-up projection $n^2$, and as the resetting movement of the trip-hand is continued it will carry the tell-tale hand with it. (See Figs. 5 and 9.) Should said trip-hand be set exactly to zero, the tell-tale hand will be carried or forced up an incline plane, P, projecting beyond the face of the dial, and the said tell-tale hand will be raised or wedged outward or forward, so that when the trip-hand is moved forward in the act of registering on a new trip it will move under the hooked projection of the tell-tale hand and carry said tell-tale hand with it. Should, however, the trip-hand during its resetting movement be left at any place on the dial but at zero, the trip-hand, when the counting operation recommences, will move off without the tell-tale hand, and thereby leave said tell-tale hand exposed to full view. (See Fig. 11.) The tell-tale hand will thus show during the whole trip the point or division on the dial from which the trip-hand was started, and, if the said trip-hand was not properly set, will expose the fraud. Should the trip-hand be properly set, that fact will clearly appear by the traveling in this example of the tell-tale with the trip-hand.

Detectives in the employ of the road and the passengers are with my improved machine enabled to see whether the conductor operates his machine in the required manner without danger of being deceived.

It will be understood, of course, from the present organization of the trip and tell-tale hands that said tell-tale will point out one more than the number or division at which the trip-hand was set; but it will be obvious that by bending or shaping the point of the tell-tale hand, so that it will point to one division on the dial back of the trip-hand, the tell-tale will show the exact number of fares that the conductor has failed to obliterate during the resetting movement of the trip-hand, and consequently the number of fares he has attempted to dishonestly appropriate.

I claim as my invention—

1. The combination, substantially as hereinbefore set forth, of the graduated dial of the register, the trip-hand movable over the face of said dial, an actuator to operate said trip-hand in the counting process, and a tell-tale hand which indicates upon the face of the machine whether the trip-hand in being reset was properly set to zero or the starting-point.

2. The combination, substantially as hereinbefore set forth, of a general register, a trip-hand movable over the face of a graduated dial, an actuator to operate said general register and said trip-hand simultaneously, or nearly so, for consecutive counting, and a tell-tale hand which indicates whether said trip-hand in being reset was turned exactly to zero or the starting-point.

3. The combination, substantially as hereinbefore set forth, of a trip-hand movable over the face of a graduated dial for consecutive counting, an alarm sounded for each actuation of said trip-hand, an actuator for operating said trip-hand and alarm, and a tell-tale hand which indicates upon the face of the machine the point or division from which the trip-hand was started in the counting process after being reset.

4. The combination, substantially as hereinbefore set forth, of the casing, the general register, the trip-hand, the alarm, the actuator for operating said register, trip-hand, and alarm simultaneously, or nearly so, a device operated from the outside of the casing to reset the trip-hand to zero to commence registering anew, and a tell-tale hand or pointer which indicates upon the face of the machine the point or division from which the trip-hand was started in the counting process after being reset.

5. The combination, substantially as hereinbefore set forth, of the trip-hand, the actuator for moving said trip-hand step by step in the counting process, the tell-tale hand, and a connection between said hands, whereby they turn together during the resetting operation.

In testimony whereof I have hereunto subscribed my name this 29th day of October, A. D. 1881.

JOHN B. BENTON.

Witnesses:
T. W. FARNSWORTH,
JAMES J. THORNLEY.